United States Patent [19]
Coulonvaux et al.

[11] Patent Number: 6,165,355
[45] Date of Patent: *Dec. 26, 2000

[54] FLUID FILTER HAVING A THREE WAY VALVE CONSTRUCTION

[75] Inventors: Paul R. Coulonvaux, Brussels, Belgium; Angelo Schiavon, Ostiglia, Italy

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/012,105

[22] Filed: Jan. 22, 1998

[51] Int. Cl.[7] .......................... B01D 27/10; B01D 35/147
[52] U.S. Cl. .......................... 210/131; 210/132; 210/315; 210/342; 137/545
[58] Field of Search ..................... 210/130, 131, 210/132, 390, 315, 297, 111, 236, 418, 429, 493.1, 342; 137/545, 625.39, 115.28

[56] References Cited

U.S. PATENT DOCUMENTS

| | | | |
|---|---|---|---|
| 556,008 | 3/1896 | Harris | 210/130 |
| 2,562,361 | 7/1951 | Kasten | 210/131 |
| 2,617,535 | 11/1952 | Hamilton | 210/132 |
| 3,239,062 | 3/1966 | Rosaen | 210/90 |
| 3,244,282 | 4/1966 | Rosaen | 210/90 |
| 3,268,077 | 8/1966 | Ball . | |
| 3,493,110 | 2/1970 | Rosaen . | |
| 3,819,052 | 6/1974 | Firth . | |
| 3,827,558 | 8/1974 | Firth . | |
| 3,847,819 | 11/1974 | Firth . | |
| 4,369,113 | 1/1983 | Stifelman . | |
| 4,428,834 | 1/1984 | McBroom et al. . | |
| 4,446,019 | 5/1984 | Robinson . | |
| 4,480,160 | 10/1984 | Stifelman . | |
| 4,512,882 | 4/1985 | Fischer et al. . | |
| 4,522,712 | 6/1985 | Fischer et al. . | |
| 4,611,627 | 9/1986 | Eidsvoog et al. . | |
| 4,615,800 | 10/1986 | Stifelman et al. . | |
| 4,743,374 | 5/1988 | Stifelman . | |
| 4,834,885 | 5/1989 | Misgen et al. . | |
| 4,883,083 | 11/1989 | Fisher et al. . | |
| 5,100,541 | 3/1992 | Kallenbach | 210/94 |
| 5,104,537 | 4/1992 | Stifelman et al. . | |
| 5,342,519 | 8/1994 | Friedmann et al. . | |
| 5,395,518 | 3/1995 | Gulsvig . | |
| 5,501,791 | 3/1996 | Theisen et al. . | |
| 5,888,383 | 3/1999 | Cox . | |

FOREIGN PATENT DOCUMENTS

| | | |
|---|---|---|
| 0 711 588 A1 | 5/1996 | European Pat. Off. . |
| 2256463 | 6/1974 | Germany . |
| 2434075 | 2/1976 | Germany . |
| 1023178 | 3/1966 | United Kingdom . |

Primary Examiner—Matthew O. Savage
Assistant Examiner—Richard W. Ward
Attorney, Agent, or Firm—Merchant & Gould P.C.

[57] ABSTRACT

The filter element assembly includes a three-way valve member internal to the assembly. The filter element comprises a primary filter construction defining an open internal volume, a first end cover, a second end cover, and a valve construction. The valve construction is positioned within the primary filter construction open internal volume and includes a valve member movable between first, second, and third valve positions. The first valve position blocks fluid flow through a bypass, such that fluid only flows through the primary filter construction. The second valve position permits fluid flow through a secondary filter construction. The third valve position permits fluid to bypass both the primary and secondary filter constructions, and proceed directly to the open internal volume and into an outlet. Methods for filtering are provided.

13 Claims, 8 Drawing Sheets

FLUID FILTER HAVING A THREE WAY VALVE CONSTRUCTION

FIELD OF THE INVENTION

This invention relates generally to fluid filters and methods. More particularly, this invention relates to valving arrangements in liquid fluid filters.

BACKGROUND OF THE INVENTION

Filters have been employed in a variety of applications including hydraulic systems, fuel systems, and engine lubrication systems. Such filters typically may include a filter element within an outside can or housing; in which flow can either be forward flow (inside-out) or reverse flow (outside-in) relative to the filter element.

Eventually, the filter element can become clogged, requiring replacement of, or cleaning of, the filter element. Failure due to clogging can be damaging to systems with downstream components, such as pumps. A lack of sufficient flow into a pump, sometimes referred to as cavitation, may seriously damage the pump.

Improvements are desirable.

SUMMARY OF THE INVENTION

The present invention is directed to a filter element assembly. The filter element assembly includes a multi-way, for example, three-way, valve construction internal to the assembly. Typically, the filter will operate to filter fluid, usually liquid. By "three-way valve", it is meant that the fluid flow through the filter element may take up to three different paths through the assembly.

In one preferred arrangement, the filter element comprises a primary filter construction defining an open internal volume, a first end cover, a second end cover, and a valve construction. The first end cover is positioned in covering relation to a first open end of the primary filter construction. The first end cover includes a bypass flow passageway in fluid flow communication with the primary filter construction open internal volume. The second end cover is mounted in covering relation to a second open end of the primary filter construction. The second end cover includes a flow passageway therethrough in fluid flow communication with the primary filter construction open internal volume. The valve construction is positioned within the primary filter construction open internal volume and includes a valve member movable between first, second, and third valve positions. The preferred valve member includes a first end piece with a central flow aperture and a secondary filter construction having first and second open ends and defining an open internal volume. The valve member, when in the first valve position, is oriented to block fluid flow through the first end cover bypass flow passageway and into the primary filter internal volume by having the valve member first end piece oriented in covering relation to the first end cover bypass flow passageway. For operation of the preferred arrangement depicted, the valve member, when in the second valve position, is biased away from the first end cover a distance no greater than a first distance. The valve construction is constructed and arranged such that when the valve member is in the second valve position, fluid flow through the first end cover bypass flow passageway is directed into the secondary filter construction open internal volume and then through the secondary filter construction and into a remainder of the primary filter open internal volume. For operation of the preferred arrangement depicted, the valve member, when in the third valve position, is biased away from the first end cover a distance greater than a first distance. The valve construction is constructed and arranged such that when the valve member is in the third valve position, fluid can flow through the first end cover bypass flow passageway and through the primary filter construction open internal volume without passage through the secondary filter construction.

In one embodiment, the valve construction includes a biasing construction or member biasing the valve member toward the first end cover under a selected pressure. Preferably, the biasing member comprises a coiled spring.

Preferably, the secondary filter construction comprises a mesh screen, either wire or plastic. The primary filter construction may, for example, comprise a cylindrical, pleated, filter media construction defining an open internal volume.

In one embodiment, a central slide guide is mounted within the primary filter construction open internal volume in extension from the first end cover. Preferably, the valve member is slidably mounted on, and circumscribes, the slide guide. In one arrangement, the central slide guide includes a cylindrical, fluid flow impervious wall. The slide guide may be oriented such that the first end cover flow passageway communicates with a portion of the primary filter construction internal volume oriented external of the central slide guide.

Preferably, the second end cover includes a central slide guide support projection thereon. In one arrangement, the central slide guide is seated within a portion of the central slide guide support projection.

Preferably, the first end cover includes an internal wall projecting therefrom toward the second end cover. The internal wall is oriented within the primary filter construction open internal volume and in position to surround the valve member. Preferably, the internal wall has a plurality of first portions and second portions. The first portions project a distance equal to the first distance. The second portions project a second distance which is greater than the first distance.

Preferably the valve member, when in the third valve position, is biased away from the first end cover a distance which is no greater than the second distance. This permits fluid flow through the primary filter construction internal volume without passage through the secondary filter construction. A mechanical stop can be used to control maximum movement of the valve member away from the first end cover.

A method for filtering liquid is also provided. The method comprises a step of directing a liquid through a first or primary filter element to a filter element interior. At least a portion of the liquid is alternatively directed through a second or auxiliary filter element and into the primary filter element interior, when a liquid flow pressure differential across the first element exceeds a first selected amount. When a resistance to liquid flow through the second filter element exceeds a second selected amount, at least a portion of the liquid is selectively directed to flow into the primary filter element interior and yet bypass both of the first and second filter elements.

Preferably, the step of directing the liquid through a second filter element includes biasing a valve member to move no greater than a first distance to permit the liquid to flow through the second filter element.

Preferably, the step of directing at least a portion of the liquid to bypass both of the first and second filter elements includes biasing the valve member to move greater than the first distance to permit at least a portion of the liquid to bypass both the first and second filter elements.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DETAILED DESCRIPTION

The present invention addresses problems associated with fluid filters in certain systems. Fluid filters of the present invention include a multi-way, for example a three-way, valve and second stage filter internal to a main filter housing. During normal operation, fluid is filtered through a primary filter element. If the primary filter element becomes clogged, the three-way valve allows fluid to flow into the primary filter element interior and through a secondary filter element. If the secondary filter element also becomes clogged, the three-way valve allows the fluid to flow into the primary filter element interior and yet bypass both the primary and secondary filter elements, and proceed to the downstream components. This inhibits, for example, cavitation in downstream pumps in hydraulic systems. This arrangement has advantages. For example, the multi-way valve and second stage filter element can be configured internal to the housing assembly. No additional components or space is required. Because the bypassing is occurring internal to the primary filter element, the main seals around the primary filter element are not compromised. Also, both filters (primary and secondary) can be easily and simultaneously changed.

I. Principles of Operation

Figure 1:
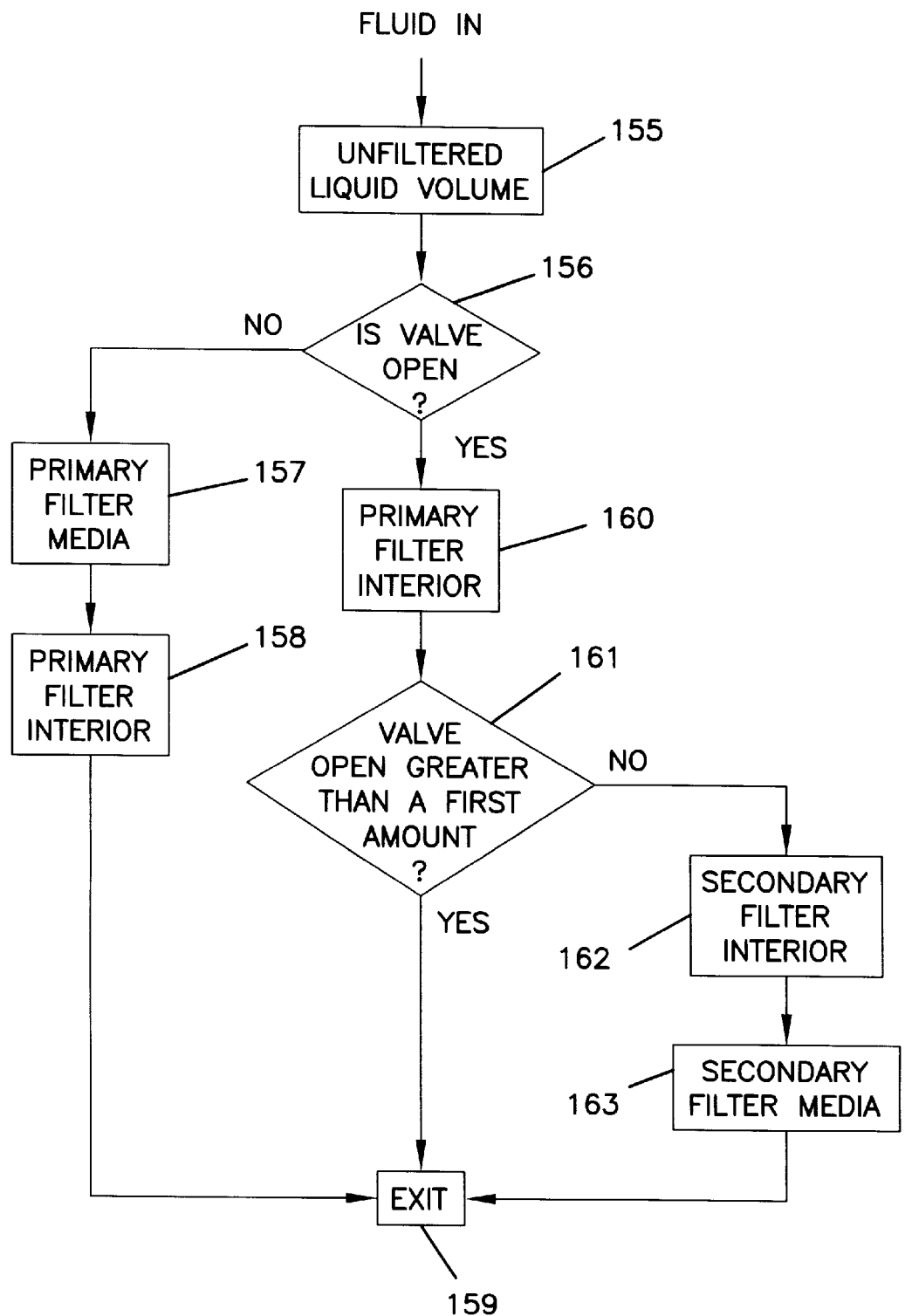
FIG. 1 is a flowchart schematically illustrating operation of a fluid filter, according to the present invention.

FIG. 1 is a flow chart schematically illustrating one example of principles of operation of the present invention.

Fluid, such as hydraulic liquid, enters the arrangement. Typically, this is through an inlet in a filter arrangement housing. After entering the arrangement, the fluid becomes part of an unfiltered liquid volume 155. From there, the liquid may take one or more of up to at least three different flow paths. Which path is taken depends upon liquid flow pressure differentials within the filter arrangement. If a liquid flow pressure differential across the first filter element is under a selected amount, a state 156 of a valve is in a closed orientation. When the state 156 of the valve is in the closed orientation, the liquid flows through the primary filter media 157 and into the primary filter interior 158. From there, the liquid exits the assembly at 159, typically through an outlet in the housing.

When a liquid flow pressure differential across the primary filter element exceeds a selected amount, the state 156 of the valve will be in an open orientation. The open orientation includes a range of positions. Although some passage through media 157 may still occur, the open position of the valve permits the fluid to flow through the valve and into the primary filter interior at 160. Depending upon the distance or how great the valve is opened at 161, at least part of the fluid may take up to two different flow paths. If the valve is not open greater than a first, selected amount, at least part of the fluid flows into a secondary filter interior 162. From there, it flows through a secondary filter media, such as a plastic mesh or screen at 163. The fluid then proceeds to exit at 159, typically through the housing outlet.

If the valve is open greater than the first, selected amount, at least a partial amount of the fluid proceeds directly to the exit at 159. That is, it does not pass through secondary filter media 163. This may occur, for example, when a resistance to liquid flow through the secondary filter media exceeds a second selected amount. For example, if the secondary filter media becomes occluded, at least a partial amount of liquid bypasses the secondary filter media, as well as the primary filter media.

It should be noted that the first bypass into the secondary filter media and the second bypass around both the primary filter media and secondary filter media occur within the primary filter interior. As described below, this helps to maintain the integrity of the top and bottom seals around the primary filter element.

II. Description of Example Overall Filter Element Assembly

Figure 2:
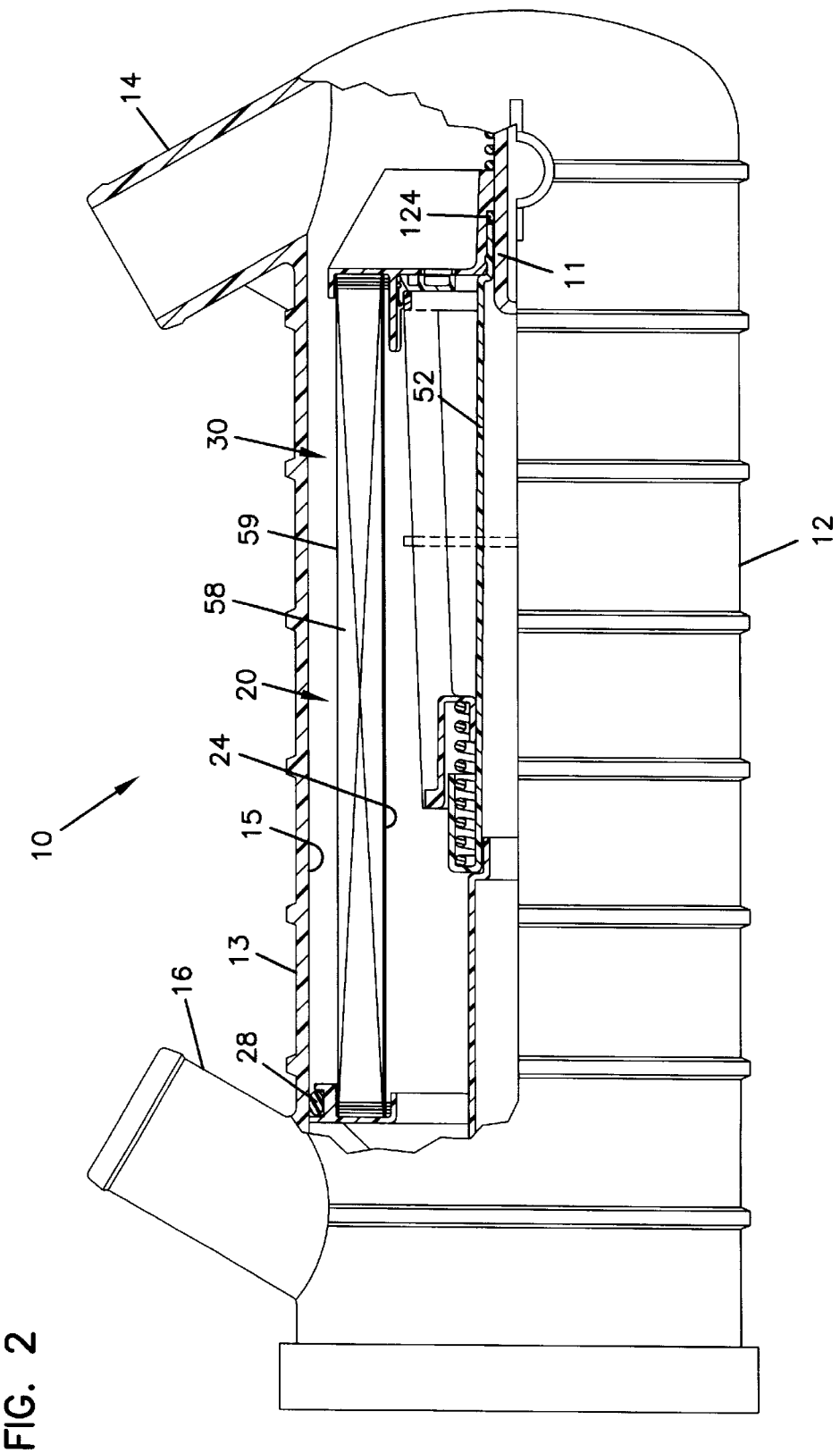
FIG. 2 is a schematic, side elevational, partial cross-sectional view of a filter element housing with a filter element therein.

Turning now to FIG. 2, a filter arrangement is schematically illustrated generally at 10. Filter arrangement 10 filters fluids including gas or liquids, and more particularly, liquids such as hydraulic fluids, oil, or other lubricating types of fluids, for example. Filter arrangement 10 includes a housing 12 having an inlet 14, into which fluid to be filtered enters, and an outlet 16, through which filtered fluid passes as it exits housing 12. Filter housing 12 is of a generally thin walled construction, and can be formed of plastic. The plastic housing is lightweight and convenient.

Figure 3:
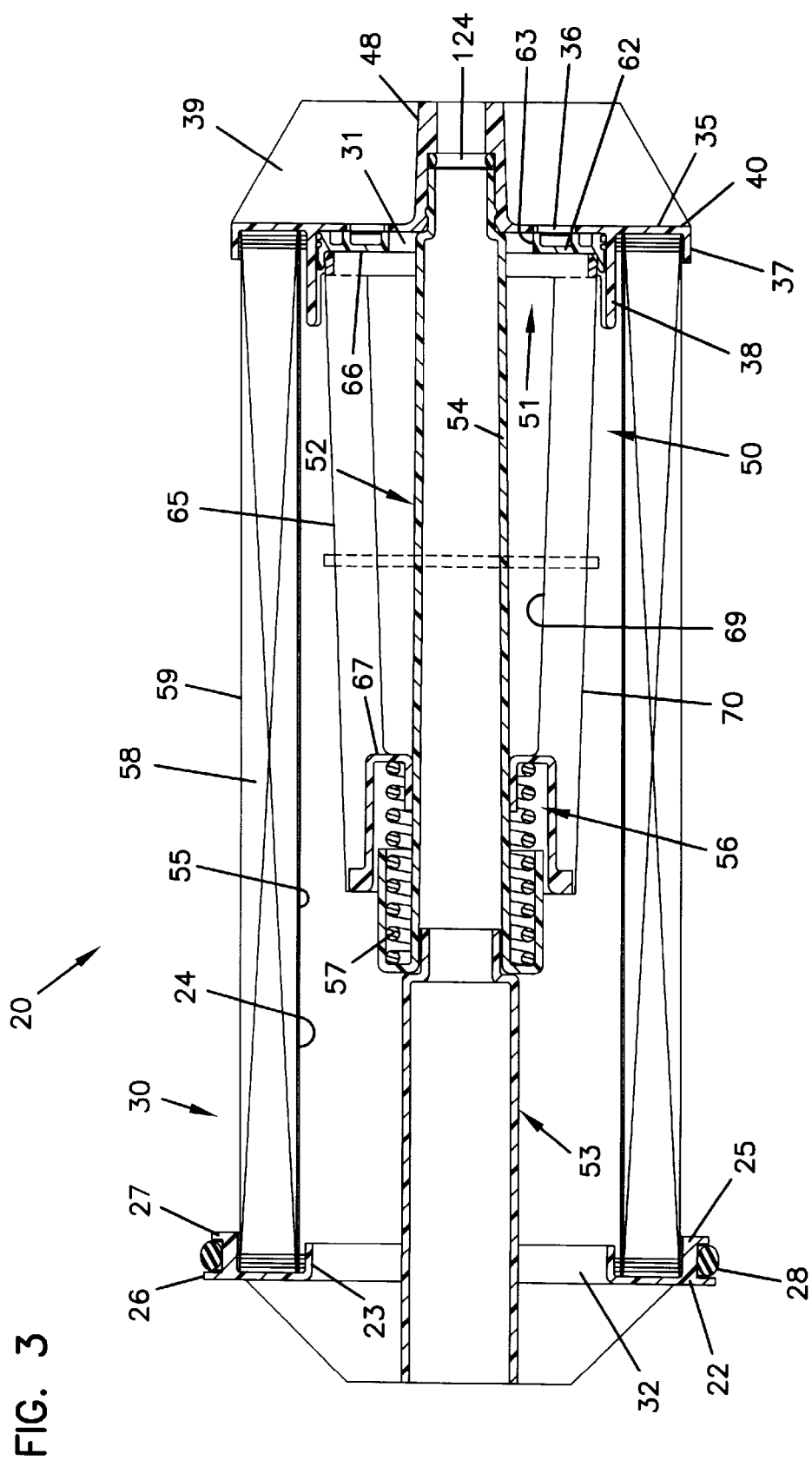
FIG. 3 is a cross-sectional, somewhat schematic view of a filter element, according to the present invention.

In accordance with the invention, the filter arrangement 10 includes a construction for removing particles and debris from liquid, particularly suitable for cleaning liquid prior to flowing to downstream components. As illustrated in FIG. 2, one example of such a construction is a filter element assembly, shown generally at 20. The filter element assembly 20 is mounted within the housing 12. The element assembly 20 includes at least a primary filter construction for removing the bulk of particles and debris in the liquid to be cleaned. One example of a primary filter construction is illustrated generally at 30. In FIG. 3, the primary filter construction 30 defines an open internal volume 24, and includes a first open end 31 and an opposite second open end 32.

In accordance with the invention, the filter element assembly includes a top, cap, or cover to close the first open end of the filter element construction, and is constructed and arranged to permit selective passage of fluid into the interior volume of the primary filter construction, without first passing through the media of the primary filter element. One example of such a cover is illustrated in FIG. 3 at 35 positioned in covering relation to the first open end 31 of the primary filter construction 30. In the particular embodiment shown, the first end cover 35 defines a by-pass flow passageway 36 to provide direct fluid flow communication (i.e., flow without passage through filter media 58) with the open internal volume 24 of the primary filter construction 30.

The filter element assembly 20 also includes a opposite cover member, end cap, or second end cover 22. Second end cover 22 is positioned in covering relation to the second open end 32.

The primary filter construction 30 has an inner liner 55. Preferably, the inner liner 55 is constructed of plastic mesh, but can be made of other materials, such as metal mesh or a plastic or metal perforation. Filter media 58 surrounds the inner liner 55 and also forms an upstream surface 59 of the primary filter construction 30. Filter media 58 may include any media sufficient to effectively filter whatever fluid is in the system. The type of media will depend upon what fluid is being filtered, what kind of system the filter is in, and may include other variables. In terms of principles of the operation of the valve construction, there is no preference for any particular type of filter media. However, in one typical system, filter media 58 can include a fluted or pleated media. Typically, this may include paper media or cellulose fiber media, sometimes including at least one side treated with polymeric fine fibers or expanded polytetrafluroethylene (PTFE). Other types of media may also be used. The media 58 is nested between the inner liner 55 and an outer wall 37 of the first end cover 35 and a wall 25 of the second end cover 22.

In accordance with the invention, structure for regulating the flow and pathways of fluid through the filter assembly is provided. One type of flow-regulating structure in accordance with the invention is a valve construction, constructed and arranged to be moveable between multiple positions. Depending upon the position the valve construction is in, the fluid can flow through the filter assembly via different paths.

One type of valve construction is shown generally at 50. In the particular embodiment illustrated in FIG. 3, valve construction 50 includes a three-way valve member 51 positioned within the open internal volume 24 of the primary filter construction 30. By "three-way", it is meant that the valve construction allows fluid to flow through the filter element assembly 20 in three different principal paths, depending upon certain conditions. That is, as shown in FIG. 1, the fluid may flow through the primary filter media, through the secondary filter media; (bypassing the primary media) or bypass both the primary and secondary filter media.

The valve member 51 includes a gate-member for providing passage of fluid through the valve. One example of a gate-member is illustrated as a portal member, or first end piece 62 defining a central flow aperture 63. First end piece 62 regulates the passage of fluid through other, downstream, components of the valve. For example, depending upon the pressure differential across the end piece 62, under certain conditions, the end piece 62 (and entire valve member 51) will move to permit flow of liquid through the aperture 63 and, then, either to a secondary filter or to an outlet flow path.

In accordance with the invention, the valve member 51 is constructed and arranged to remove debris from fluid. In the particular embodiment illustrated, the valve member 51 includes a secondary filter construction 65 having a first end 66 and an opposite second end 67. Filter media or screen 70 extends between the first and second ends 66, 67. The secondary filter construction 65 defines an open internal volume 69 between the first and second ends 66, 67. The secondary filter construction 65, when assembled in the system of FIG. 3, operates to remove debris and, preferably, larger particles from the liquid being filtered. Generally, the secondary filter construction 65 operates when the primary filter construction 30 becomes clogged or occluded.

According to the invention, a track or glide assembly is provided for allowing the valve assembly to move among its multiple positions and to alter the flow pathways of fluid through the filter assembly. As herein embodied, one example of a track or glide assembly includes a central slide guide 52. In the particular example illustrated, the slide guide 52 includes a cylindrical wall 54 within the primary filter construction open internal volume 24 and in extension from the first end cover 35. The valve member 51 is slidably mounted on and circumscribes the cylindrical wall 54. A central slide guide support projection 53 extends from the second end cover 22 to seat and support the central slide guide 52. A biasing member 56 biases the valve member 51 toward the first end cover 35 under a selected pressure. In the specific example illustrated, the biasing member 56 includes a coiled spring 57.

An O-ring 28 is held by the second end cover 22. The O-ring 28 creates an external radial seal when the filter element assembly 20 is positioned inside of the housing 12 (FIG. 2). An O-ring 124 in the first end cover 35 provides a seal between the first end cover 35, the central slide guide 52, and the housing 12 (FIG. 2). For example, the housing 12 may include an internally downwardly projecting wall 11 which engages a side of the O-ring 124 to provide a radial seal between the downwardly projecting wall 11 of the housing and the filter element assembly 20. It should be appreciated that the bypass of the primary filter construction 30 and of both the primary filter construction 30 and the secondary filter construction 65 occurs within the open internal volume 24 of the primary filter construction 30. Thus, the bypass operations occur between the radial seals formed by O-ring 28 and O-ring 124. The integrity of these radial seals with respect to the housing is not compromised.

Before discussing in more detail the components of the preferred embodiment depicted, the general principles of operation are described. Referring to FIGS. 1 and 2, during normal operation, that is during operation the pressure differential across the primary element is no greater than a selected amount, typically no greater than about 0.3 bar, and preferably, no greater than about 0.25 bar, fluid is directed through the inlet 14, into a channel 15 between a housing wall 13 and the exterior surface 59 of the primary filter construction 30. The fluid passes through the media 58 and into the internal volume 24. It then passes through the second open end 32 and through the outlet 16. During normal operation, the valve member 51 is in its "first position," and blocks fluid flow through the bypass flow passageway 36.

If the media 58 of the primary filter element 30 becomes occluded, that is, when a liquid flow pressure differential across the primary filter construction 30 exceeds a selected amount, the valve member 51 moves to a "second position" which is biased away from the first end cover by a certain distance. For the embodiments shown, the second position is actually a range of positions, described more below. The second valve position permits the fluid flow to be directed into the secondary filter construction internal volume 69 and then through the secondary filter construction 65 into the open internal volume 24 of the primary filter construction 30. From there it passes through the second open end 32 and out through the outlet 16. Typically, the valve member 51 will be configured (and the spring 57 will be sized) to operate in the second position when a liquid flow pressure differential across the primary filter construction 30 exceeds about 0.3 bar, and more typically, exceeds about 0.25 bar.

When a liquid flow pressure differential across the secondary filter construction 65 exceeds a selected amount, the valve member 51 moves to a "third valve position", biased away from the first end cover 35 by a distance greater than the first distance. In the preferred embodiments shown, the third valve position actually is a range of positions, described in more detail below. The third valve position permits fluid to flow through the bypass flow passageway 36 in the first end cover 35 and into the open internal volume 24 of the primary filter construction 30 without passage through the primary filter construction 30 or the secondary filter construction 65.

III. Description of Example Sub-Assemblies

A. First End Cover

Figure 5:
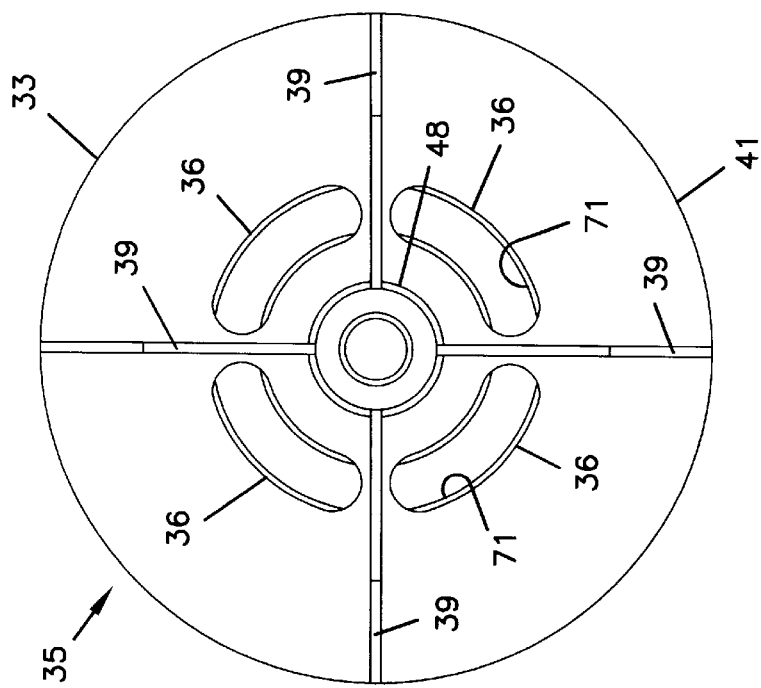
FIG. 5 is a plan view of a first end cover of FIG. 3, and from the view 5—5 in FIG. 6, according to the present invention.
Figure 6:
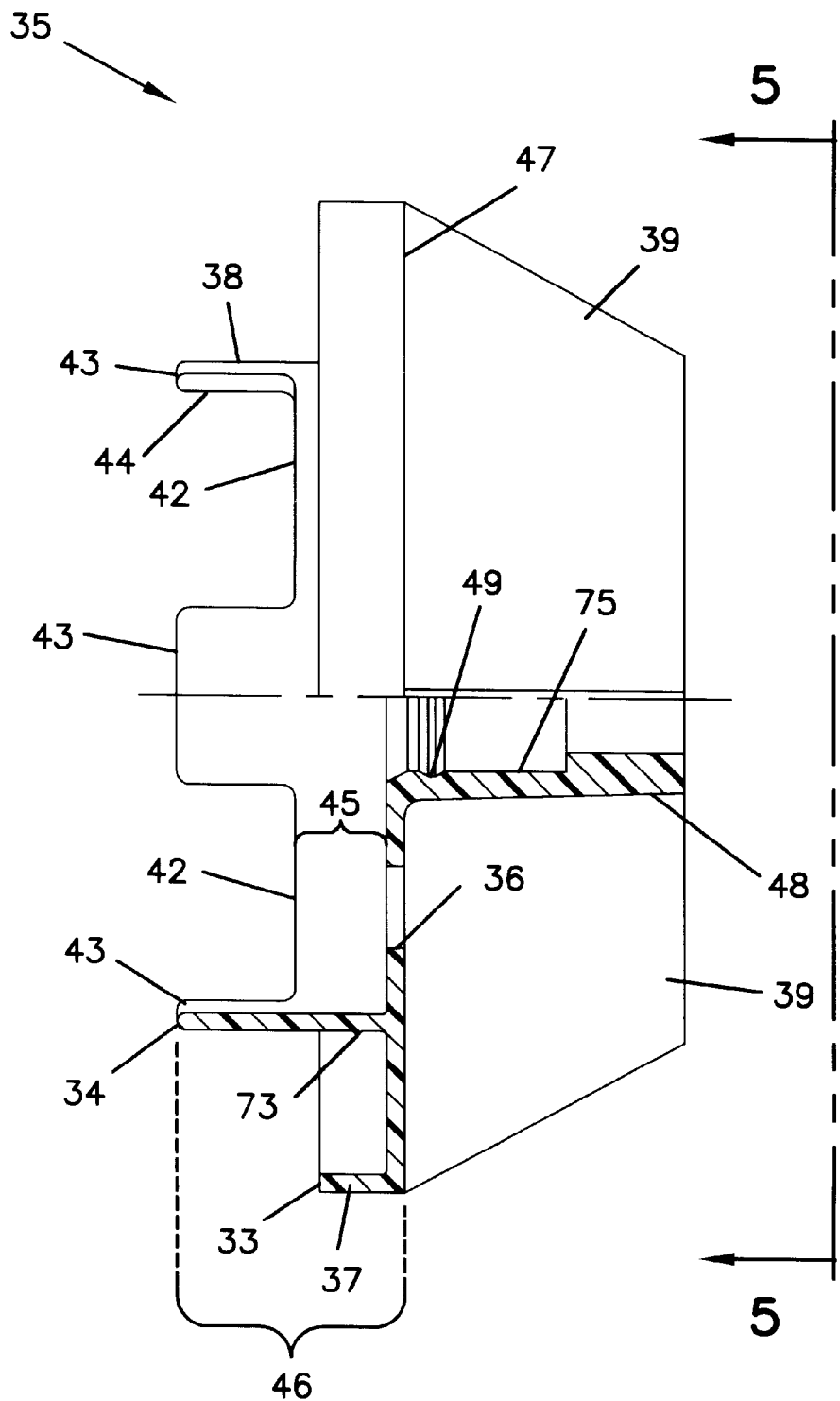
FIG. 6 is a side elevation, partial cross-sectional view of the end cover of FIG. 5.

In reference to FIG. 5, the first end cover 35 is shown in top plan view. First end cover 35, i.e. the top or end cap functions to cover to close the first open end of the filter element construction, while also being constructed and arranged to permit selective passage of fluid into the interior volume of the primary filter construction, without first passing through the media of the primary filter element. While a variety of working embodiments are possible, in the particular embodiment illustrated, first end cover 35 is generally circular in shape (when viewed in top plan, FIG. 5) with an outer rim 33 and an inner rim 34 (FIG. 6). In FIG. 5, the bypass flow passageway 36 includes generally four apertures 71 spaced about a central cylindrical wall 48. Between each of the apertures 71 is a vane member 39 projecting from an outer periphery 41 to the cylindrical wall 48. The vanes are for adding strength to the end cap.

FIG. 6 is a side elevation, partial cross-sectional view of the first end cover 35. The first end cover 35 includes the outer wall 37 circumscribing the primary filter construction 30. Generally parallel to the outer wall 37 is an internal wall 38, which is generally circumscribed by the outer wall 37. The internal wall 38 projects from the end cover portion 40 which joins and is generally normal to the outer wall 37 and internal wall 38 toward the second open end 32. The internal wall 38 is oriented within the primary filter construction open internal volume 24 and surrounds the valve member 50.

The end cover 35 is constructed and arranged to regulate fluid flow paths through the assembly 20. In particular, the end cover 35 includes access structure, i.e., a gate, or door, or access port, which permits selective passage of fluid to the interior volume of either the primary or secondary filter element. In the specific example illustrated, the internal wall 38 defines a plurality of flow ports 44 for permitting the passage of fluid therethough, when the valve member 51 is in its third position. More particularly, along the inner rim 34 of the end cover 35 is a plurality of alternating first portions 42 and second portions 43. The alternating first and second portions 42, 43 include a series or plurality of rectangular structures alternated with a series or plurality of rectangular recesses, (in this example, flow ports 44) resembling a rectangular wave. When assembled in the system of FIG. 3, the alternating rectangular structures and recesses function to regulate the flow path of fluid through the filter. When the force created by a fluid pressure differential reaches or exceeds a predetermined amount, the alternating first and second portions allow passage of liquid into, first, the interior volume of the secondary filter element (thereby permitting the fluid to bypass the primary filter element), and second, into the interior volume of the primary filter element (thereby permitting the fluid to bypass both of the primary and secondary filter elements).

When assembled as illustrated in FIG. 3, the internal wall 38 functions as a track, or slide, or guide, with respect to the valve construction 50. That is, the internal wall 38 provides a sliding surface for a portion of the valve construction 50 to move relative to. Due to the relative length of the rectangular structures, as compared to the distance which the valve construction is allowed to move, the end cover 35, and in particular, the internal wall 38 keeps the valve construction 50 constrained to move within a predetermined path, preferably a linear path, and prevents the valve construction 50 from becoming disengaged from its position within the assembly 20.

The first portions 42 project a distance away from the end cover portion 40 by a first distance 45, corresponding to the length of the first portions 42. The second portions 43 project a second distance 46 away from the end cover portion 40, which is greater than the first distance 45. This second distance 46 corresponds to a length of the second portions 43. As is explained below, the first distance 45 of the first portions 42 cooperate with the valve member 51 to determine whether the valve member 51 is in its second or third position.

The first end cover 35 also includes an exterior surface 47 and the cylindrical wall 48 projecting from the exterior surface 47. The cylindrical wall 48 forms an internal cylindrical bore 75 for receiving the central slide guide 52 (FIG. 3). The cylindrical wall 48 defines an inwardly projecting recess 49 for receiving a projection in a wall of the central slide guide 52, to be described in more detail below.

A projection 73 extends from the internal wall 38. The projection 73 is for creating interference between the potting material and the wall 38 of the end cover 35.

The design of end cover 35 lends itself to convenient manufacturing techniques. For example, the end cover 35 may be made through molding, particularly injection molding. The alternating rectangular structures and recesses is convenient to easily remove from a mold.

An alternative design for end cover 35 includes replacing the plurality of alternating first portions 42 and second portions 43 along the rim 34 with a straight rim. The fluid flow could be regulated, instead, with holes or apertures through the internal wall 38. However, the alternating first and second portions 42, 43 is convenient and preferred.

B. Valve Construction

Figure 7:
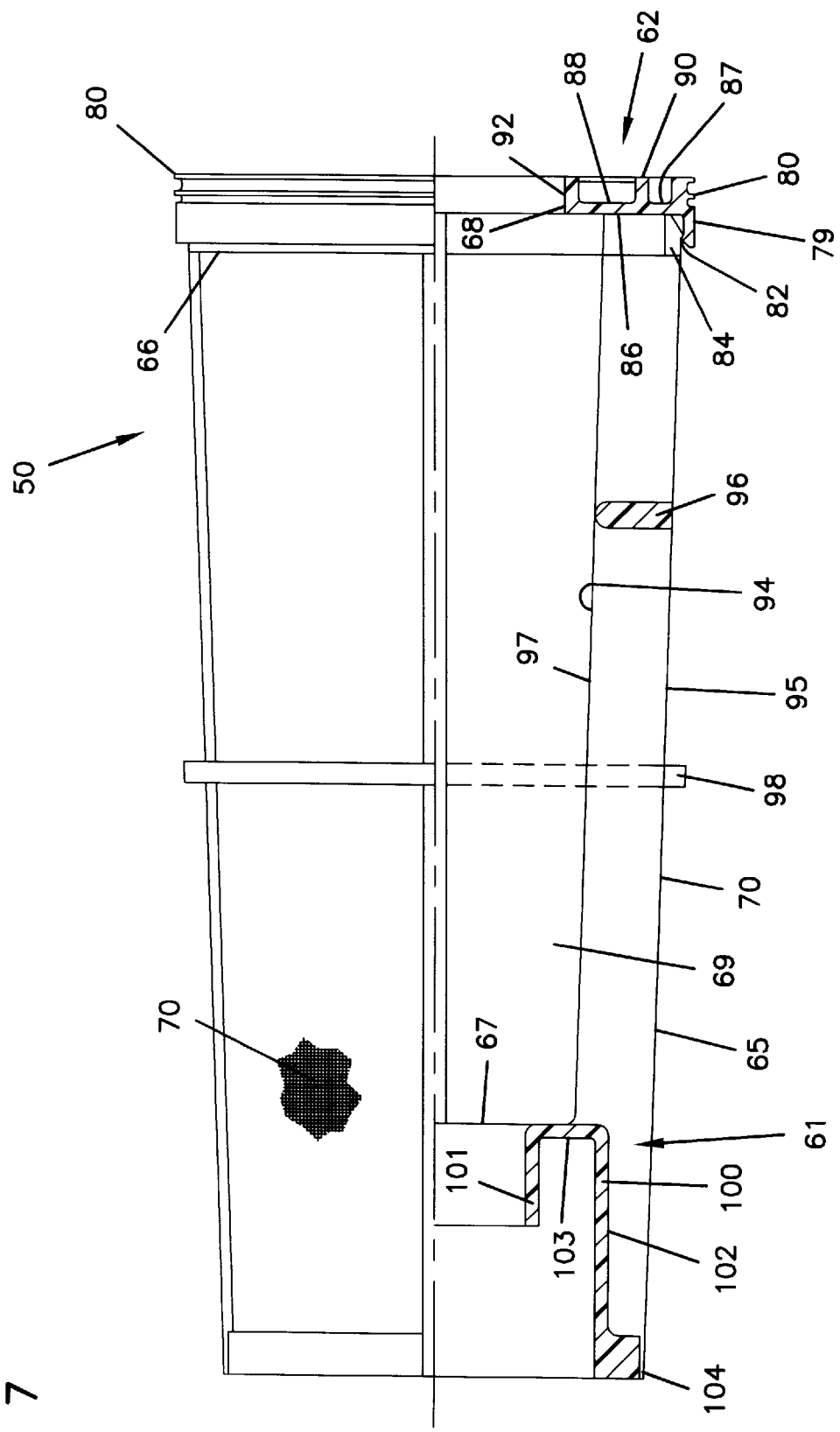
FIG. 7 is a side elevation, partial cross-sectional view of a secondary filter element, according to the present invention.

Turning now to FIG. 7, a side elevational, partial cross-sectional view of the valve construction 50 is illustrated. The valve construction 50 includes the first end piece 62, or gate-member, or portal, covering the first end 66 of the secondary filter construction 65 and for providing passage of fluid through the valve. First end piece 62 regulates the passage of fluid through other, downstream, components of the valve. For example, when the force created by the pressure differential across the primary filter construction 30 (FIG. 3) exceeds the force of the biasing member, the end piece will move to permit flow of liquid through the aperture 63 and then, to the internal volume of either the secondary filter or primary filter. The internal volume of the secondary filter is within the internal volume of the primary filter.

In this particular embodiment, the first end piece 62 includes an outer wall portion 79 which is in slidable engagement with the first end cover internal wall 38. The outer wall portion 79 defines a pair of outwardly projecting ribs 80 for creating a liquid seal between the valve construction 50 (FIG. 3) and first end cover internal wall 38 (FIG. 3).

On an opposite side of outer wall portion 79 is an internal wall surface 82 having a recess for receiving member 84.

Extending generally normal to outer wall portion 79 is a wall section 86. Wall section 86 includes a first section 87 and a pressure receiving surface 88. The first section 87 and pressure receiving surface 88 are divided by an upstanding partition 90, which extends generally normal to the wall section 86. Opposite from the partition 90 is a second upstanding wall 92. The pressure receiving surface 88, bordered by the partition 90 and upstanding wall 92 is oriented to be in communication with the bypass flow passageway 36 of the first end cover 35 (FIG. 3). The first end piece also defines a central flow aperture 68.

The design of the first end piece 62 lends itself to convenient manufacturing techniques. For example, all of the parts are designed to be easily molded, particularly injection molding.

Attached to the first end piece 62 is the secondary filter construction 65. The secondary filter construction 65 includes an upstream surface 94 and a downstream flow surface 95. In the particular embodiment illustrated, filter media 70 is preferably a screen to remove large debris from the fluid. As used herein, the term "screen" includes a member which prevents selective passage of particles greater than a certain size therethrough. Therefore, a screen, in this context, acts as a filter member. One preferred screen includes a plastic mesh of 200 micron mesh. Secondary filter construction 65 forms a generally frusto-conical section.

Also shown is a molded framework at 96, 97, 98. Molded framework 96, 97, 98 supports the filter media 70.

The valve construction 50 includes a stop member constructed and arranged for providing a stop, or limiting movement of the valve relative to the first end cover 35 (FIG. 3). The stop member may also provide a containment structure for holding and containing a biasing mechanism. In the example illustrated, a stop member is shown at 61. In this particular example, the stop member 61 comprises a basket 100 at the second end 67. The basket 100 includes a first wall portion 101 in slidable communication with the central slide guide 52 (FIG. 3). When assembled in the arrangement shown in FIGS. 2 and 3, the basket 100 cooperates with the slide guide 52 to limit the sliding movement of the valve construction 50 within the assembly 20. This helps to prevent the valve construction 50 from becoming disassembled or out of alignment with the first end cover 35.

The basket 100 also includes a second wall portion 102. Second wall portion 102 is joined to the first wall portion 101 at a bight section 103 and extends slightly angled from the bight section 103. The second wall portion is longer than the first wall portion and ends at a projecting foot 104. The basket 100 constrains the coiled spring 57 and prevents the spring 57 from becoming disengaged and falling out of its correct position within the assembly.

The design of the basket 100 lends itself to convenient manufacturing techniques. For example, the basket 100 can be easily molded, such as injection molding. Further, the first end piece 62, framework 96, 97, 98, and basket 100 may be molded as a single piece.

C. Slide Guide

Figure 8:
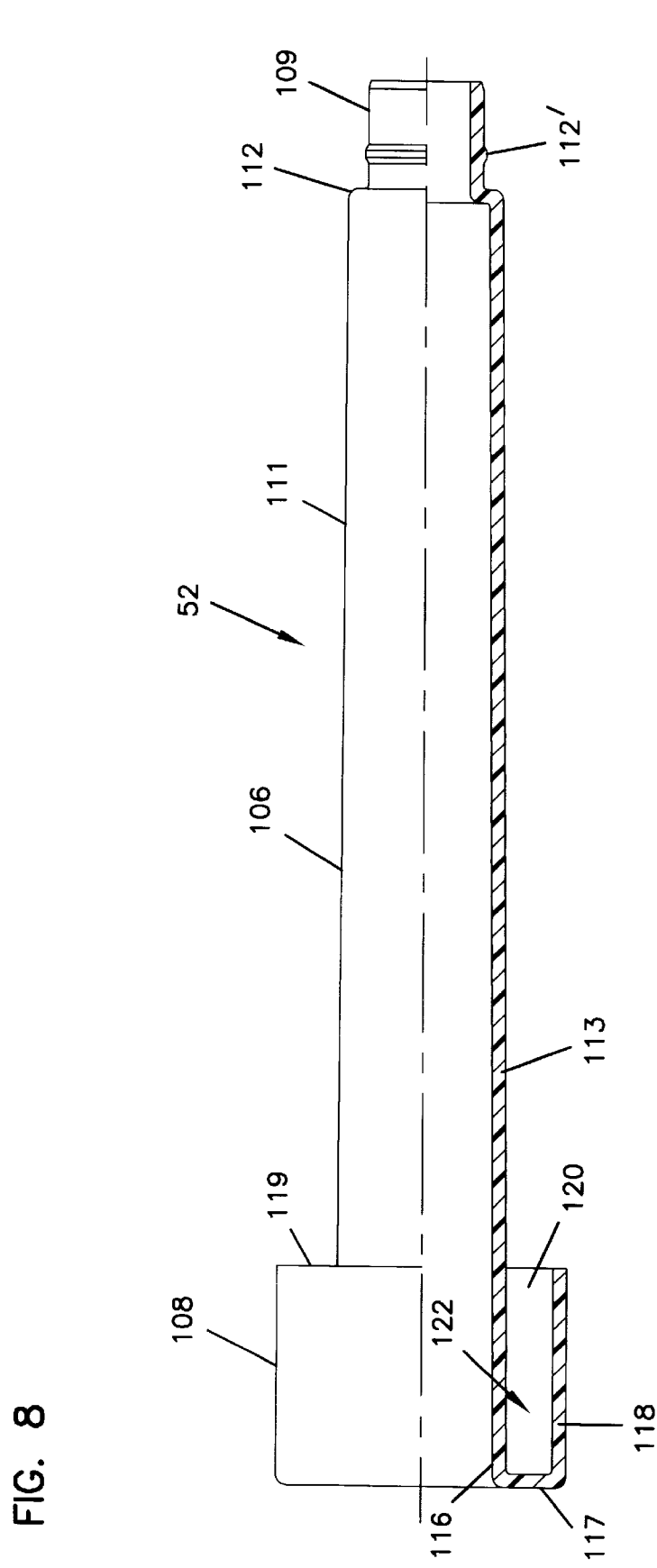
FIG. 8 is a side elevation, partial cross-sectional view of a central slide guide, according to the present invention.

In reference now to FIG. 8, the central slide guide 52, or glide element, is illustrated in side elevation, partial cross-sectional view. The central slide guide 52 is constructed and arranged to permit the valve assembly to move between its multiple positions and to alter the flow pathways of fluid through the filter assembly. In the specific example illustrated in FIG. 8, this particular slide guide 52 includes an elongated column 106 tapering from a first portion 108 of greatest diameter at one end down to a second portion 109 of narrowest diameter at an opposite end thereof. A middle portion 111 extends between the first portion 108 and second portion 109.

Second portion 109 is generally cylindrical in shape and is for seating within cylindrical bore 75 (FIG. 6) in the first end cover 35. Second portion 109 includes an outwardly extending projection 112 for snap-fitting within the inwardly projecting recess 49 (FIG. 6) within the cylindrical wall 48 (FIG. 6) of the first end cover 35 (FIG. 6).

In FIG. 8, the middle portion 111 of the column 106 extends between the first portion 108 and the second portion 109. A shoulder 112 joins the middle portion 111 to the second portion 109. Middle portion 111 is cylindrical in shape with a generally flat, straight wall 113, for providing a slide surface for the valve member 51.

First portion 108 includes a first wall section 116 which is continuous with wall 113, a second wall section 117 which is generally normal to first wall section 116, and a upstanding flange section 118. Upstanding flange section 118 is generally parallel to the first wall section 116, and terminates at a tip 119. First wall section 116 and flange section 118 are spaced apart and oppose one another to define a space 120. Together, flange section 118 and first and second wall sections 116, 117 define a seat 122 for the coil spring 57 (FIG. 3).

The tip 119 of flange section 118 cooperates with the basket 100 (FIG. 7) to form part of a stop assembly. When assembled in the arrangement shown in FIGS. 2 and 3, the tip 119 engages and abuts bight section 103 of basket 100 to limit the sliding movement of the valve construction 50 within the assembly 20. This helps to prevent the valve construction 50 from becoming disassembled or out of alignment with the first end cover 35.

Referring now to FIG. 2, installed in the filter element assembly 20, the slide guide 52 is mounted within bore 75 (FIG. 6) of the first end cover 35. The O-ring 124 seals the slide construction 52 within the bore 75 (FIG. 6). The O-ring 124 also, when assembled in the housing 12, forms a radial seal with a wall of the housing. The valve construction 50 is mounted around and circumscribes the slide construction 52. The biasing member 56, in the example illustrated a coiled spring 57, is seated within seat 122 and is positioned in extension (or compression) between second wall section 117 (FIG. 8) and bight section 103 (FIG. 8). In response to fluid pressure on the pressure receiving surface 88, the valve member 51 slides relative to the central slide guide 52. That is, first wall portion 101 (FIG. 7) slides against wall 113 (FIG. 8), and outer wall portion 79 (FIG. 7) slides relative to internal wall 38 (FIG. 3).

Central slide guide 52 includes a wall constructed of a material which is generally impervious to fluid flow therethrough. This material may include, for example, plastic.

The design of slide guide 52 lends itself to convenient manufacturing techniques. For example, the slide guide may be conveniently molded, particularly, injection molded.

D. Second End Cover

Figure 9:
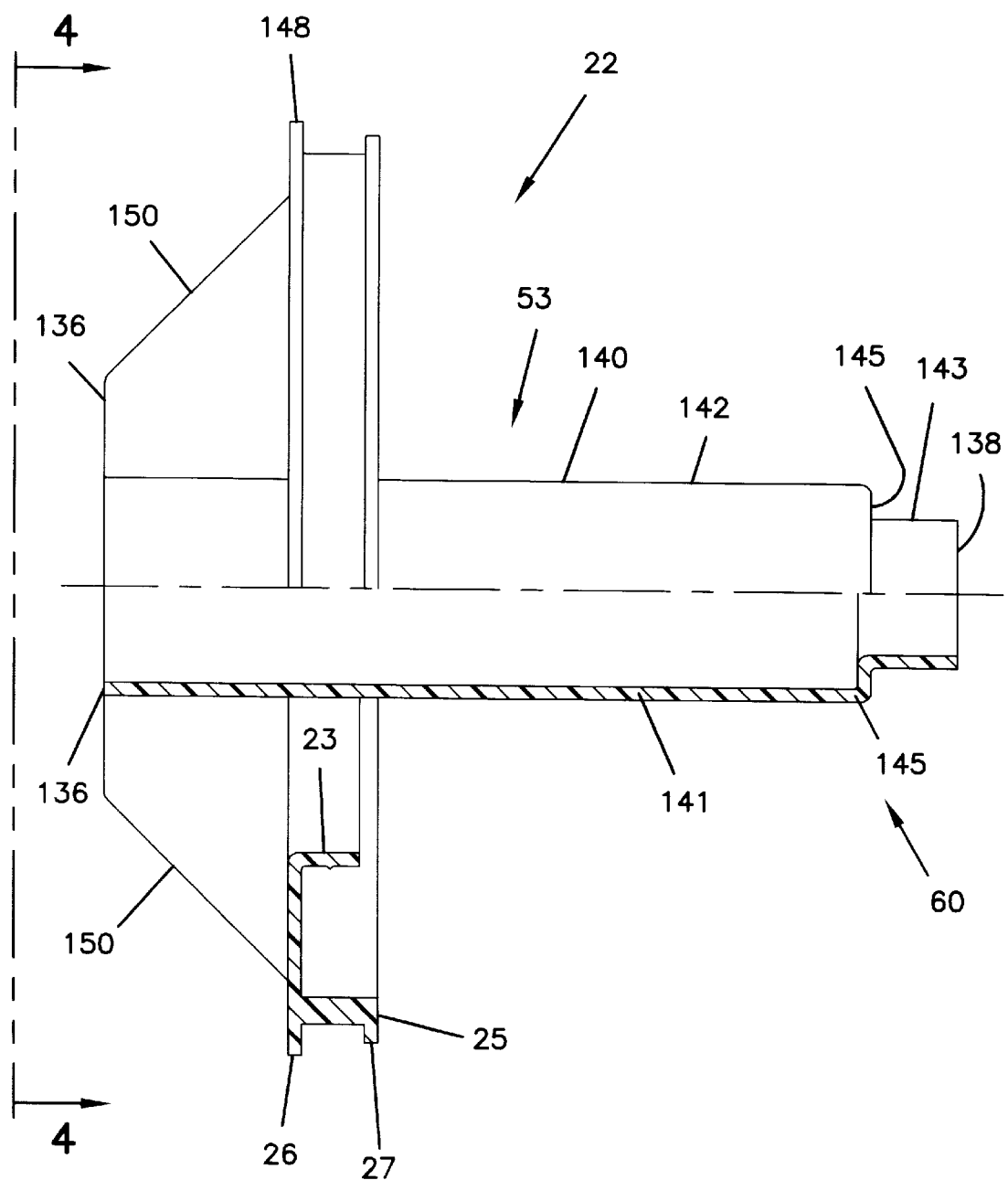
FIG. 9 is a side elevation, partial cross-sectional view of a second end cover with a central slide guide support projection, according to the present invention.

In reference to FIG. 9, the second end cover 22 is illustrated in side elevational, partial cross-sectional view. Second end cover 22 includes an inner wall 23 defining a circular opening into the interior 24 of the filter element assembly. Second end cover 22 also includes an outer wall 25 with first and second rims 26, 27 projecting therefrom. Seated between first and second rims 26, 27 is the O-ring 28 (FIG. 3). O-ring 28 provides a radial seal between the filter element assembly 20 and the housing 12.

The second end cover 22 includes a member for supporting the central slide guide, and holding the slide guide and valve construction in their respective places within the assembly. As herein embodied, one particular arrangement for supporting the central slide guide is shown generally at 60.

In this particular example, in FIG. 9, the support arrangement 60 includes a central slide guide support projection 53 extending from an end 136 of the second end cover 22 to an opposite closed end 138 within the open internal volume 24 (FIG. 3) of the primary filter construction 30. In the specific embodiment illustrated, the central slide guide support projection 53 includes a cylindrical member 140 having a fluid flow impervious wall 141. The cylindrical member 140 includes a region of a first diameter 142, and a region of a second, smaller diameter 143. The region of the second diameter 143 is also cylindrical, and is joined to the first region by an intermittent shoulder 145. Shoulder 145 provides an engagement surface for abutting the second wall section 117 (FIG. 8) of the central slide guide 52 (FIG. 8).

The second end cover 22 also includes an outer periphery 148, and a plurality (four) of vanes 150 extending from a region spaced from outer periphery 148 up to the end surface 136. The vanes 150 help provide strength to the second end cover 22.

Installed in the assembly 20 (FIG. 3), the second end cover 22 is fitted in covering relation to the second open end 32. The central support projection 53 is positioned within the open internal volume 24 so that the shoulder 145 (FIG. 9) engages and abuts the second wall section 117 (FIG. 8) in the central slide guide 52. In this way, the projection 53 supports and holds the central slide guide 52.

Figure 4:
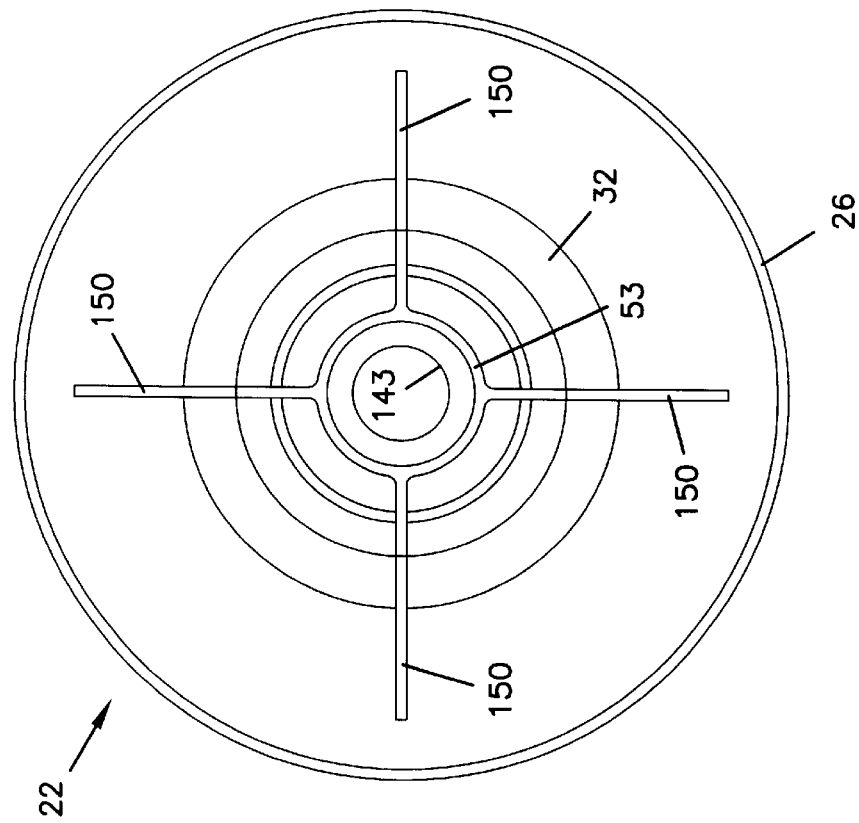
FIG. 4 is a plan view of a second end cover of FIG. 3, and from the view 4—4 in FIG. 9, according to the present invention.

FIG. 4 shows an end view of the second end cover 22, from the direction of 4—4 (FIG. 9).

The second end cover 22 and slide guide support projection 53 are conveniently manufactured in, for example, injection molding processes.

IV. Example Operation

In operation, liquid to be filtered is directed through the inlet 14 and through the channel 15. During normal operation, that is, during operation when the force created by the fluid pressure differential across the primary filter 30 is less than the force exerted by the biasing member 56, the valve member 51 is in its first position. The first position includes the position which permits the liquid to flow through the media 58 of the primary filter construction 30 and into the internal volume 24, and blocks fluid flow through the bypass flow aperture 36. Fluid then flows through the second open end 32 and through the outlet 16. In the first position, the valve member 51 generally does not allow fluid flow through the second filter construction 65. Also, in the first position, the valve member 51 does not allow fluid to flow directly to the internal volume 24, without first passing through the primary filter media 58. While a variety of working structures are contemplated, in the particular embodiment illustrated, when the first end piece 62 is engaging and in contact with the first end cover 35, the valve member 51 is in the first position.

As the pressure differential across the primary element begins to build, for example, if the media 58 occludes, the force on the pressure receiving surface 88 of the first end piece 62 increases. When the force on the pressure-receiving surface 88 becomes greater than the force of the spring 57, (typically, at about 0.3 bar) the valve member 51 slides relative to the central slide member 52 and toward the second end cover 22 and into and through the ranges corresponding to the second position. While the valve is in the second position, at least a portion of the fluid is allowed to pass through fluid flow passageway 36 and into the internal volume 69 of the secondary filter construction 65. Fluid is also still allowed to flow through the media of the primary element. While in the second position, the fluid flows from the open internal volume 69 of the secondary filter construction 65, through the secondary filter media 70, and into the open internal volume 24 of the primary filter construction 30. From there, the fluid flows through the second open end 32 and through the outlet 16.

In the second position, the valve member 51 does not allow fluid to flow directly to the internal volume 24, without first passing through the secondary filter media 70. Again, while a variety of working arrangements are contemplated, in the particular embodiment illustrated, the second position includes a range of distances which the valve member 51 moves through. This range of distances, in the illustrated embodiment, is as follows: At a first extreme, the distance is when the end piece 62 and the first end cover 35 initially separate from touching engagement and permit fluid to flow into the open internal volume 69 of the second filter construction 65. At an opposite extreme, the distance is no greater than the first distance 45 (FIG. 5). That is, to be in the second position, the valve member 51 typically cannot move a distance farther than the length of the first portions 42 of the first end cover 35.

If resistance to liquid flow through the secondary filter construction 65 exceeds a certain amount, a force on the pressure receiving surface 88 on the first end piece 62 increases. When the force exceeds an amount to compress the spring 57 even greater, the valve member 51 moves from its second position to its third position. In the third position, an open fluid communication is created between the flow passageway 36 and the open internal volume 24 of the primary filter construction 30. Therefore, when the valve member 51 is in the third position, a portion of the fluid is allowed to flow through the flow passageway 36 and directly into the internal volume 24 of the primary filter construction 30, completely bypassing both the primary media 58 and the secondary media 70. From there, it passes through the second open end 32 and through the outlet 16. While in the third position, fluid is still permitted to flow through the primary filter element 30.

The third position includes a range of distances which the valve member 51 moves through. While a variety of working structures are contemplated, in this particular embodiment, this range of distances is as follows: At a first extreme, the third position includes a distance just greater than the first distance 45 (FIG. 6), i.e., the length of the first portions 42. At an opposite extreme, the third position includes a distance no greater than the second distance 46 (FIG. 6), i.e., the length of the second portions 43. Specifically, the maximum distance which the valve member 51 may move is the distance between tip 119 of flange section 118 and the inner surface of the bight section 103 of the basket 100. At that point, the tip 119 will abut the inner bright surface surface, and the valve member 51 will not be permitted to slide any further toward the second end cover 22. The length of the second portions 43 of the internal wall 38 is greater than the distance between tip 151 and surface 152. This prevents the valve member 51 from being able to slide out of engagement within the internal wall 38. When the valve member 51 is in the third position, the first end piece 62 is slid along internal wall 38 down past the first portions 42. This permits fluid to flow in a path directly to the internal volume 24, skipping or bypassing both of the primary media 58 and the secondary media 70.

Thus, the design of the present invention not only takes into consideration the possible occlusion of the primary filter, but also the secondary filter, by providing the bypass of both the primary and secondary filters. This ensures the protection and safety of downstream equipment, by preventing cavitation and ensuring fluid is allowed to pass through the assembly and get to the downstream equipment.

V. A Specific Preferred Embodiment

It will be understood that a wide variety of specific configurations and applications are feasible, using techniques described herein. In this section, a particular fluid filter arrangement with bypass will be described.

The arrangement described would be particularly configured for use in a system with the following characteristics: maximum fluid flow rate of about 115 1/min.; typical pressure drop of about 0.014 bar at 115 1/min. and 40 CST; typical operating temperature range of about −200° C. to +108° C.; valve member 51 set to move from closed orientation to open orientation at about 0.2–0.3 bar, typically about 0.25 bar.

The element 20 has a length of about 270 mm.

The first end cover 35 has an outer diameter of about 98 mm. The first portions have a length of about 8 mm. The second portions have a length of about 22 mm. The second portions have a width of about 17 mm.

The second end cover 22 has an outer diameter of about 106 mm, and an inner diameter of about 67 mm. Region 143 has an outer diameter of about 14 mm, and region 142 has an outer diameter of about 25 mm. The length of wall 141 is about 89 mm.

The valve construction 50 has a length of about 143 mm. The diameter at end 62 is about 61 mm. The diameter at end 104 is about 48 mm.

The basket 100 has a length of first section 101 of about 10 mm. The first section 101 has an inner diameter of about 21 mm. The second section 102 has a length of about 29 mm, and an inner diameter of about 38 mm.

The slide guide 52 has a wall 113 of a length of about 174 mm. The wall 118 has a length of about 26 mm. The first portion 108 has an outer diameter of about 35 mm. The second portion 109 has an outer diameter of about 14 mm.

The above specification, examples, and data provide a complete description of the manufacture and use of the invention. Many embodiments of the invention can be made without departing from the spirit and scope of the invention.

We claim:

1. A filter element comprising:
   (a) a primary filter construction defining an open internal volume, said primary filter construction having first and second, opposite, open ends;
   (b) a first end cover positioned in covering relation to said primary filter construction first open end; said first end cover including a bypass flow passageway therethrough in fluid flow communication with said primary filter construction open internal volume;
   (c) a second end cover mounted in covering relation to said primary filter construction second open end; said second end cover including a flow passageway therethrough in fluid flow communication with said primary filter construction open internal volume;
   (d) a valve construction positioned with said primary filter construction open internal volume including a valve member moveable between first, second and third valve positions;
   (i) said valve member including a first end piece with a central flow aperture and a secondary filter construction having first and second ends and defining an open internal volume;
   (ii) said valve member, when in said first valve position, being oriented to block fluid flow through said first end cover bypass flow passageway and into said primary filter internal volume, by having said valve member first end piece oriented in covering relation to said first end cover bypass flow passageway;
   (iii) said valve member, when in said second valve position, being biased away from said first end cover a distance no greater than a first distance; said valve construction being constructed and arranged such that when said valve member is in said second valve position, fluid flow through said first end cover bypass flow passageway is directed: (A) into said secondary filter construction open internal volume; and then (B) trough said secondary filter construction and into a remainder of said primary filter open internal volume;
   (iv) said valve member, when in said third valve position, being biased away from said first end cover a distance greater than said first distance and a distance less than a second distance; said valve construction being constructed and arranged such that when said valve member is in said third valve position fluid can flow through said first end cover bypass flow passageway and through said primary filter construction open internal volume without necessary passage through said secondary filter construction;
   (v) said valve construction including a coiled spring constructed and arranged to bias said valve member toward said first end cover under a selected pressure;
   (e) a central slide guide mounted within said primary filter construction open internal volume in extension from said first end cover;
   (i) said valve member being slidably mounted on, and circumscribing, said slide guide;
   (f) a basket positioned at said second end of said secondary filter construction;
   (i) said basket having a first wall portion, a second wall portion, and a bight section;
   (ii) said first wall portion being in slideable communication with said slide guide;
   (iii) said basket being constructed and arranged to constrain said coiled spring;
   (g) an internal wall projecting from said first end cover toward said second end cover;
   (i) said internal wall being oriented within said primary filter construction open internal volume and in position to surround said valve member; and
   (ii) said internal wall defining a plurality of flow ports having a plurality of first portions and a plurality of second portions, each of said first portions alternating with said second portions, said first portions projecting said first distance from said first end cover and said second portions projecting said second distance from said first end cover, with said second distance being greater than said first distance; and
   (h) a flange section connected to said central slide guide, a tie of said flange section cooperating with said bight section of said basket to form a stop assembly which limits the sliding movement of said valve construction to a maximum distance of less than said second distance so as to help prevent the valve construction from becoming disassembled or out of alignment with said first end cover.

2. A filter construction according to claim 1 wherein:
(a) said central slide guide includes a cylindrical, fluid flow impervious, wall;
   (i) said slide guide being oriented such that said first end cover flow passageway communicates with a portion of said primary filter construction internal volume oriented externally of said central slide guide.

3. A filter construction according to claim 2 wherein:
(a) said second end cover includes a central slide guide support projection thereon.

4. A filter construction according to claim 2 wherein:
(a) said central slide guide includes a seat supporting said coiled spring.

5. A filter construction according to claim 4 wherein:
(a) said secondary filter construction comprises a plastic strainer.

6. A filter construction according to claim 5 wherein:
(a) said primary filter construction comprises a cylindrical, pleated, filter media construction.

7. A filter construction according to claim 6 wherein:
(a) said valve member, when in said third valve position, is biased away from said first end cover a distance no greater than said second distance.

8. A filter construction according to claim 7 wherein:
(a) said first end cover includes an exterior surface and a cylindrical wall projecting from said exterior surface;
   (i) said cylindrical wall being circumscribed by said first end cover internal wall.

9. A filter construction according to claim 8 wherein:
(a) said first end cover includes an outer periphery and a plurality of vanes projecting from said exterior surface;
   (i) each of said vanes extending from said outer periphery to said first end cover cylindrical wall.

10. A filter construction according to claim 7 wherein:
(a) said first end piece of said valve member including an outer wall portion in slidable engagement with said first end cover internal wall.

11. A filter construction according to claim 8 wherein:
(a) said first end piece of said valve member includes a pressure-receiving surface; said pressure receiving surface being in communication with said bypass flow passageway;
   (i) said pressure-receiving surface being circumscribed by said first end piece outer wall portion.

12. A filter construction according to claim 11 wherein:
(a) said valve member includes a basket having first and second wall portions;
   (i) said first wall portion being in slidable engagement with said central slide guide cylindrical, fluid flow impervious wall; and
   (ii) said second wall portion circumscribing said central slide guide seat.

13. A filter construction according to claim 12 wherein:
(a) said coiled spring is trapped between said central slide guide seat and said valve member basket.

* * * * *

UNITED STATES PATENT AND TRADEMARK OFFICE
CERTIFICATE OF CORRECTION

PATENT NO. : 6,165,355  
DATED : December 26, 2000  
INVENTOR(S) : Coulonvaux et al.

It is certified that error appears in the above-identified patent and that said Letters Patent is hereby corrected as shown below:

Column 14,  
Line 64, "tie" should read -- tip --

Signed and Sealed this

Thirtieth Day of April, 2002

Attest:

JAMES E. ROGAN  
*Director of the United States Patent and Trademark Office*

*Attesting Officer*